United States Patent [19]

Zuck

[11] Patent Number: 4,491,337
[45] Date of Patent: Jan. 1, 1985

[54] FOLDING BICYCLE

[76] Inventor: Daniel R. Zuck, 14273 Beaver St., Sylmar, Calif. 91342

[21] Appl. No.: 378,836

[22] Filed: May 17, 1982

Related U.S. Application Data

[63] Continuation-in-part of Ser. No. 940,901, Sep. 11, 1978, abandoned, and Ser. No. 235,532, Feb. 18, 1981, Pat. No. 4,002,351.

[51] Int. Cl.³ .................. B62K 3/14; B62K 13/00
[52] U.S. Cl. .................... 280/278; 280/231; 280/273; 280/287; 403/4
[58] Field of Search ............ 280/278, 287, 281 R, 280/231, 273, 261; 403/162, 4, 161, 163, DIG. 8, DIG. 9

[56] References Cited

U.S. PATENT DOCUMENTS

| | | | |
|---|---|---|---|
| 2,708,587 | 5/1955 | Zuck | 280/278 |
| 2,997,308 | 8/1961 | Boudreau | 403/4 |
| 3,015,498 | 1/1962 | Tanaka et al. | 280/278 |
| 3,092,362 | 6/1963 | Walsh | 280/231 |
| 3,623,749 | 11/1971 | Jensen | 280/278 |
| 4,002,351 | 1/1977 | Zuck | 280/278 |
| 4,029,326 | 6/1977 | Blow, Jr. | 280/231 |

Primary Examiner—Joseph F. Peters, Jr.
Assistant Examiner—Donn McGiehan

[57] ABSTRACT

This invention relates to an improvement in men's and ladies' folding and tandem bicycles. The improvement provides commonality of structural and mechanical means and commonality of configuration components between a men's and ladies style bicycle, and tandem bicycles. This invention provides a bicycle with alternative men's and ladies' model structural means. It permits elimination of the top horizontal bar of the folding bicycle frame, allowing construction of a ladies' style folding bicycle, which folds on three axes with exclusive structural support means in the lower member or members fixedly secured to a vertical structural spreader bar in the rear of the bicycle frame. The said vertical bar provides vertical adjustable seat support means for the rider, with the seat remaining in proper forward adjustment during folding and unfolding of the bicycle. The improvement expands the capability of bicycle folding means into ladies' model configuration and tandem rider model configurations. There is a commonality of construction in a men's, ladies', and tandem model configurations. A detent is disclosed to manually release and retain the articulated latches when they are locked, thereby avoiding inadvertant release when the bicycle is ridden. An eccentric adjusts out the looseness in the folding joints to provide adjustment for manufacturing tolerances and normal wear. Also disclosed is a tandem style bicycle the size of a single rider model, except that it has provisions for a tandem seat and a tandem set of pedals with the pedals mounted forward of the rear wheel center axle.

6 Claims, 12 Drawing Figures

FOLDING BICYCLE

This is a continuation-in-part of Ser. No. 940,901, filed Sept. 11, 1978 now abandoned and Ser. No. 235,532 2/18/81 now U.S. Pat. No. 4,002,351.

OBJECTS OF THE INVENTION

This invention relates to and has for its object the improvement of folding bicycles in the girl's and men's model configurations and the creation of a unique, compact, folding two-passenger dual bicycle in a tandem model configuration.

Another object is to provide positive locking means on the locking latches which hold the bicycle unfolded in the normally ridden configuration. Another object is to provide positive locking means on the locking means with quickly, easily releasable means on the locking latches which hold the bicycle unfolded in the normally ridden configuration.

Another object of this invention is to provide a folding frame assembly in a girl's model configuration. Another object is to provide such a frame assembly omitting the top horizontal bar with one or more forward extending structural lower frame members exclusively from the rear vertical structural frame member referred to as spreader bar to the forward wheel steering journal housing.

Another object of this invention is to provide a folding bicycle for tandem riders with a dual set of pedals small enough to be folded into an envelope substantially the size of the standard single girl's or boy's bicycle configuration.

Another object of this invention by omitting the provisions to fold the frame, is to provide a frame assembly, seat assembly, a dual pedal assembly and seat in tandem for tandem riders on a bicycle which in size and configuration is substantially that of the single-rider, non-folding type bicycle type bicycle.

Another object of this invention is to provide a girl's bicycle frame assembly with frame folding means whereby the substantially vertical member serving as spreader bar between the rear fork means adjoins and supports the rider;s seat means, and the said vertical frame member is separated and is not structurally integrated with the rear folding fork means.

Another object of this invention is to provide a girl's bicycle frame configuration and tandem dual-rider bicycle frame configuration that can be folded easily without disassembly or separation of the frame into separate assemblies when the bicycle is folded, thereby making the folded bicycle easy to handle and store and transport aboard airplanes, in automobiles, in buses, in trains, in taxis, in boats, and to store and to shelter the bicycle in apartments, etc.

Another object of this invention is to provide a bicycle that can be folded easily into a package envelope approximately square and substantially in base dimensions a little greater than the diameter of one of its wheels.

Another object of this invention is to provide a bicycle that can be folded and unfolded easily and in a minimum time. Tests have shown that this bicycle herein disclosed can be folded in 10 seconds and unfolded and ready to ride in 10 seconds.

Another object of this invention is to provide positive adjustment means and positive locking means to secure the latches of the folding frame means when the bicycle is being ridden.

Another object of this invention is to provide a commonality of parts for men's and girl's and tandem folding bicycle frame configurations.

How the foregoing objects and advantages are secured, together with others which will occur to those skilled in the art, will be more apparent from the following description making reference to the accompanying drawings, in which

BRIEF DESCRIPTION OF THE DRAWINGS

FIG. 5 is a fragmental view taken on line 5—5 of FIG. 2 showing the latch which when released allows the front wheel fork to fold; and FIG. 6 is a fragmental view taken on line 6—6 of FIG. 2 showing the hinge line on which the front wheel fork assembly pivots when the fork is folded.

BACKGROUND OF THE INVENTION

Figure 1:
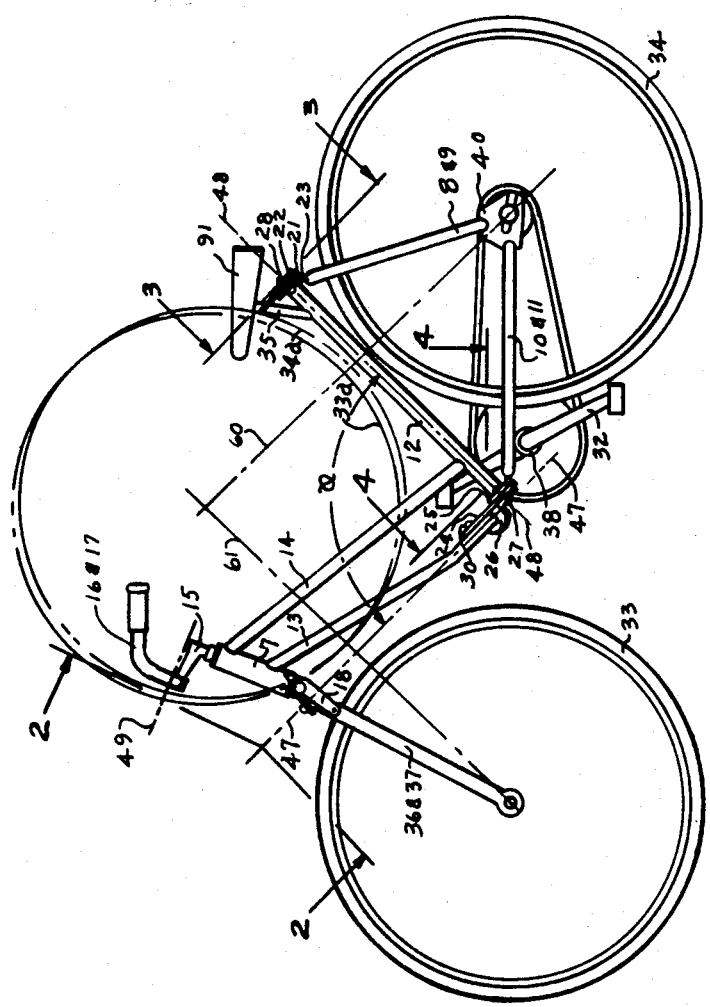
FIG. 1 is a side elevation view of a folding bicycle showing the position of the wheels in the unfolded and in the broken lines representing folded position.

This invention is related to my prior patent, patent number 2,709,587 for a folding bicycle.

The above said folding bicycle prior patent was limited to a men's style frame configuration because of the inherent arrangement of the frame structural members in their relations to the folding elements of the bicycle frame assembly. While the said patent taught the folding of a men's bicycle frame assembly, a girl's folding bicycle frame assembly could not be constructed. The said prior folding bicycle did not provide a suitable seat post for vertical adjustment of the seat. The incomplete triangle of the center frame could not provide for a seat post and support for vertical adjustment of the seat. The center frame was an incompleted triangular frame with only two legs of the triangle. A completed triangular center frame is required for structural and torsional rigidity of a folding bicycle frame with two folding axes. The narrow useage and very limited utility of the above exclusive teaching in men's folding bicycles of the said patent and lack of torsional stiffness greatly inhibited the sale and utility of folding bicycles because of its limited model configurations and utilization of these bikes by experienced and knowledgeable bicyclists, and professional persons who were very negative regarding the above Zuck bicycle because of its defeciencies.

SUMMARY OF THE INVENTION

The teaching of this patent disclosure application expands the folding bicycle model configurations into the girl's frame model configuration and into the tandem dual-rider model configuration, and also provides commonality and improvements for the men's folding bicycle configuration, and provides suitable seat post support means for a vertically adjustable seat. The rider's seat adjustment means comprises the known state of the art, which the prior art in Zuck No. 2,708,587 could not simulate, wherein a seat post in a vertical position supports a rider's seat with the said seat being adjustable vertically within a sleeve member of the bicycle frame structure with means to secure and adjust the said seat post to a desired height.

The teaching of this patent disclosure and application provides an improved latching means for locking in the unfolded configuration as opposed to the latching means and manual releasing means described in above said U.S. Pat. No. 2,708,587, colume 2 in the last paragraph which describes the latch as follows: "A tight friction fit with closely controlled tolerances in the manufacturing of latches 18, 22, and 24 and the associated mating parts has proved adequate to maintain these latches in the locked position. In the manufacture of latches 18, 22, and 24 a very slight interference at the start of engagement with the studs 43, 55, and 58 may be used to further ensure retaining of the latches in the locked position when the bicycle is unfolded."

In actual manufacturing practice it was impossible to control the tolerances to maintain the friction necessary to keep the latches securely locked. In addition normal service wear caused the slight interference to be worn away causing the latches to come loose during the riding of the bicycle and allowing the bicycle to accidently fold up when it was ridden which has resulted in serious accidents. Also the above statement of the prior art, "slight interference at start of engagement with studs 43, 55, and 58" made manual latching of the latches 18, 22, and 24 impossible.

DESCRIPTION OF THE PREFERRED EMBODIMENT

Figure 9:
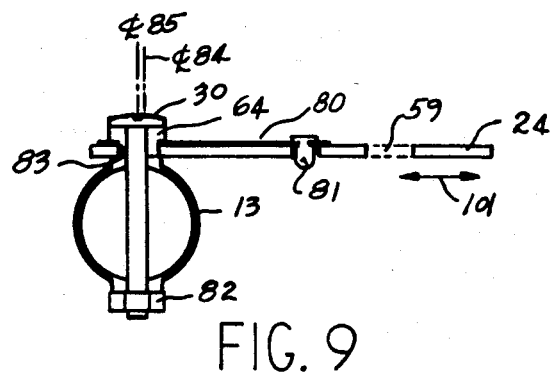
FIG. 9 is a sectional view taken on line 9—9 in FIG. 4A showing the locking detent and eccentric adjustment.

The eccentric adjustment screw 64 shown in FIG. 9 is disclosed as a means to preset and to preadjust the latch clearance during initial assembly and during its service life. The detent 81 by means of spring 80 safely secures the latch against inadvertant release when the bicycle is being ridden.

As shown in FIG. 1 this folding bicycle is comprised substantially of a center main frame body assembly, a rear wheel fork assembly, a front wheel fork assembly, and a steering handle bar assembly.

The rear wheel fork assembly is comprised of tubes 8 and 9, tubes 10 and 11, pedal assembly 32, crank housing 38, crank hanger 39 forward of the rear wheel, lower folding pivot fitting 25, upper folding pivot fitting 23, and rear wheel hanger fittings 40.

The main frame body assembly is comprised of tube 14, the vertical tube 12 serving the frame assembly as a rear spreader bar means hingedly attaching to the rear wheel forks, tube 13, front fork steering housing 7, the configuration being substantially an integral triangular truss frame for structural stiffness and torsional rigidity, a seat post 35, upper folding hinge fitting 21, and lower folding hinge fitting 26, leaf spring 80 in FIG. 9, detents 81, and latches 22 and 24. The said seat post 35 is a fixedly secured adjacent tubular member to the said spreader bar 12. The said seat post 35 is a tubular receptacle support for vertical adjustment for the seat 91 in the conventional form known to the art.

The front wheel fork assembly is comprised of tube 36, tube 37, latch 18, front fork caster assembly 19, tube 41, and pivot fitting 44.

The handle bar assembly is comprised of stem 15, center section 52, hinge fitting 51, hinge fitting 50, and handle bars 16, and 17. Latches 65 and 66 are provided to secure the handle bars in the normal configuration for riding the bicycle.

Figure 2:
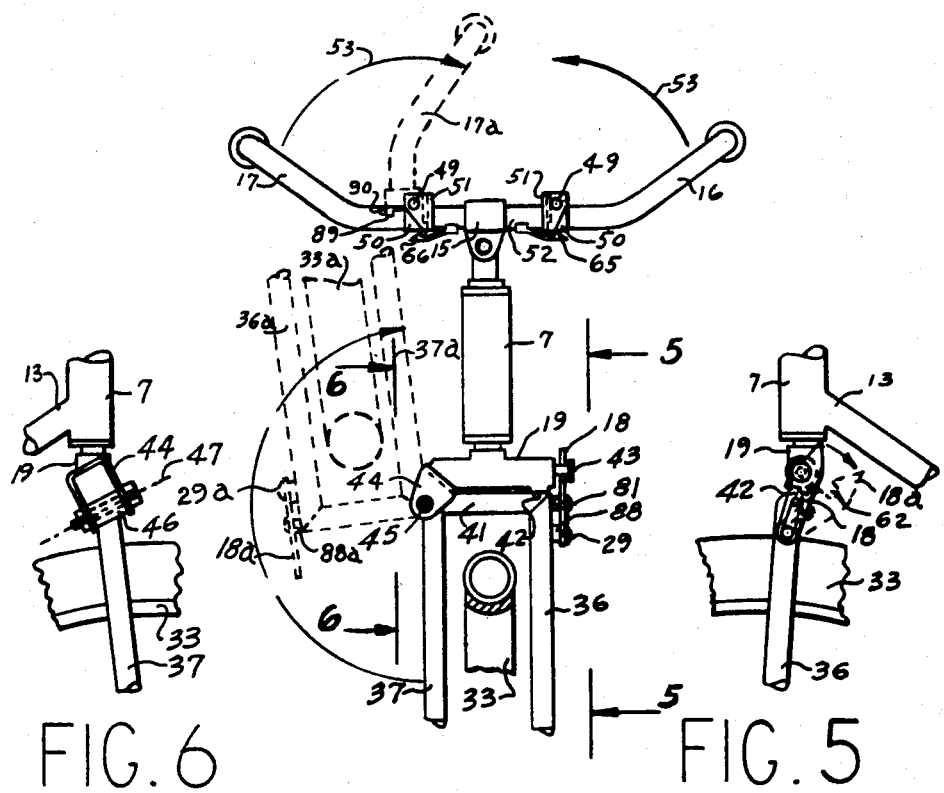
FIG. 2 is a sectional view taken on the line 2—2 of FIG. 1 showing the folding of the handle bars and front wheel fork.
Figure 3:
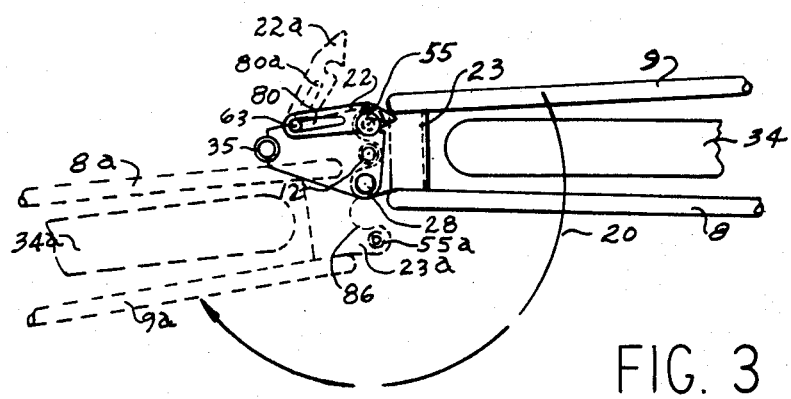
FIG. 3 is a sectional view taken on line 3—3 of FIG. 1 and FIG. 7 showing the rear wheel upper fork assembly latched to the upper frame body in the unfolded position and unlatched and in the folded position as indicated by the broken lines.
Figure 4:
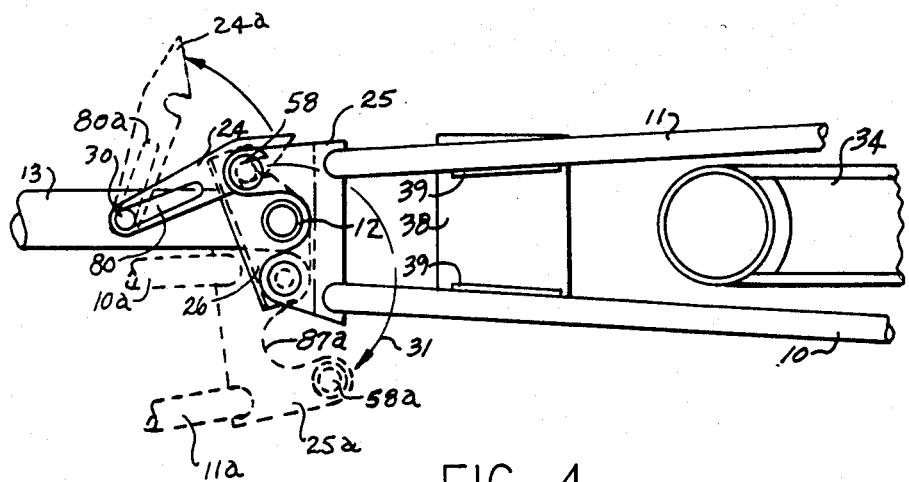
FIG. 4 is a sectional view taken on line 4—4 of FIG. 1 and FIG. 7 showing the rear wheel lower fork assembly and lower forward frame body in the latched position and in the folded position as indicated by the broken lines.

The bicycle unfolded and ready for riding is shown in FIG. 1 solid lines, FIG. 2 solid lines, FIG. 3 solid lines, FIG. 4 solid lines, FIG. 5 and FIG. 6.

To fold the bicycle, the handle bars 16 and 17 are moved after releasing latches 65 and 66, in the direction indicated by arrows 53, on pivot axis 49 in FIG. 2. Latch 18, FIG. 5 is moved to position 18a about pintle 29. This frees flanged stud 43 on caster assembly 19 and front wheel and fork assembly 41, 36, and 37 which are free to pivot about pivot axis 47 on bolt 45 and hinge fitting 46. The front fork folded position is indicated by broken lines in FIG. 2, 36a, 37a, and 35a. Hooks 22 and 24 FIG. 3 and 4 are moved to position 22a and 24a about pintles 63 and 30 respectively in FIG. 3 and 4. This frees the rear fork assembly to pivot on pivot axis 48 FIG. 1 on hinge pins 27 and 28. The folded position of the rear fork assembly is indicated by broken lines 8a and 9a, 10a and 11a, and is also indicated by arrows 20 and 31 in FIG. 3 and 4. Like members with the suffix "a" indicate the parts of the bicycle in their respective positions when the bicycle is folded.

Figure 3A:
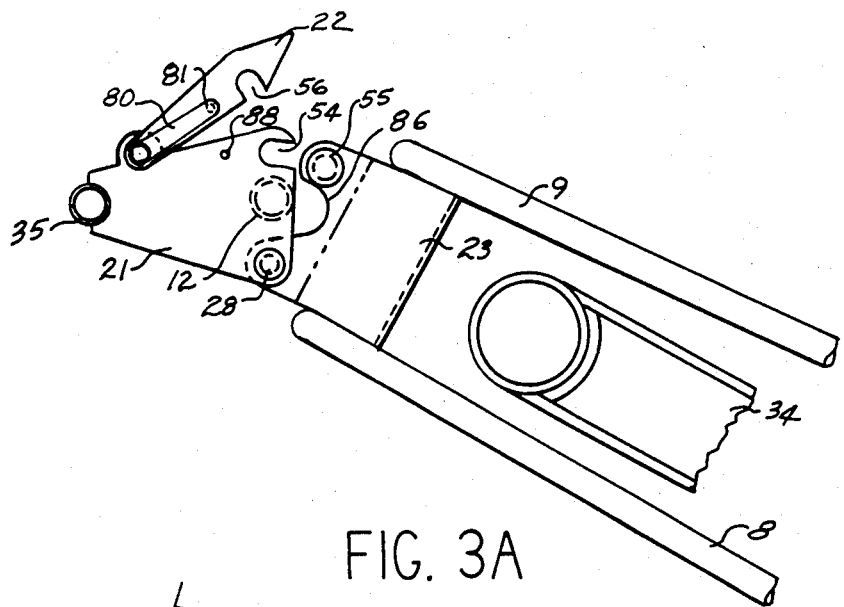
FIG. 3A is an enlarged sectional view taken on line 3—3 of FIG. 1 and FIG. 7 showing the upper rear wheel fork assembly unlatched from the forward frame body.

As shown in FIG. 3A, fitting 21 has a slot 54 which receives flanged stud 55. Hook 22 also has a slot 56 which functions as a hook and which engages stud 55 when said stud 55 is rotated into slot 54. Latch 22 then securely locks the rear fork assembly to the upper main frame body in the unfolded position.

Figure 4A:
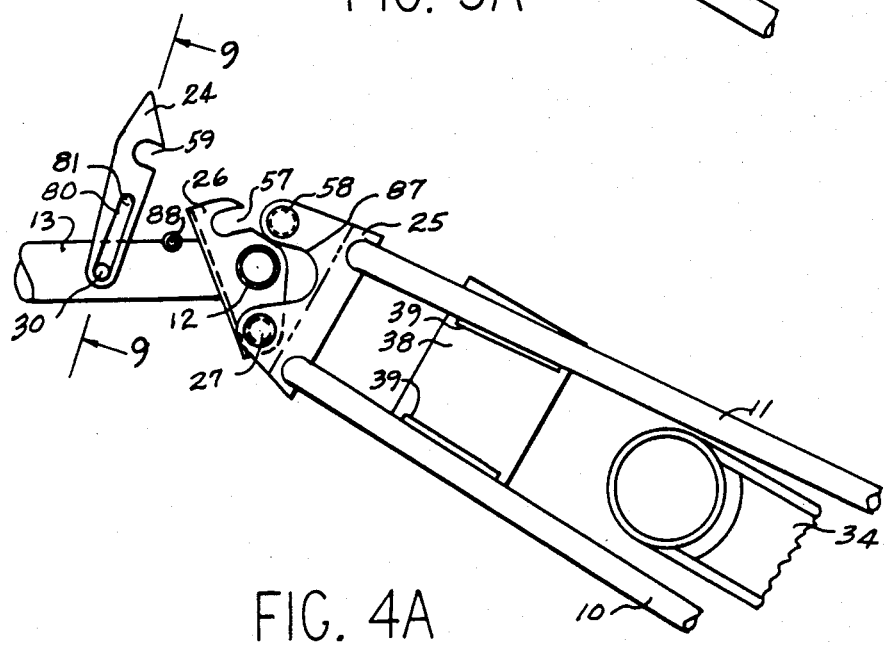
FIG. 4A is a sectional view taken on line 4—4 of FIG. 1 and FIG. 7 showing the rear wheel lower fork assembly unlatched from the forward lower frame body.

Also, as shown in FIG. 4A, fitting 26 has a slot 57 which receives the flanged stud 58. Hook 24 also has a slot 59 which functions as a hook and which engages stud 58 when said stud 58 is rotated into slot 57. Latch 24 then securely locks the rear fork assembly to the lower center main frame body in the unfolded position.

As shown in FIG. 5, the hook 18 has a slot 62 which engages stud 43 shown in FIG. 2 and folds the front fork assembly securely locked against bumper 42 in the unfolded position.

The centerline of the axle of the rear wheel travels on a plane designated by line 60, FIG. 1 when the rear wheel fork assembly is rotated toward the folded position about axis 48.

The centerline of the axle of the front wheel travels on the plane designated by line 61, FIG. 1 when the front fork assembly is rotated toward the folded position about the pivot axis 47.

In the folded position, the front wheel occupies the position at 33a, and the rear wheel occupies the position at 34a, FIG. 2, substantially coaxial and adjacent each other with the frame body, the folded handle bars, and the seat between the front and rear wheels.

The essence of compactly folding this bicycle is the angular interrelation of the folding pivot axes 47 and 48 of the front and rear fork assemblies. This angle on the bicycle of FIG. 1 is substantially 90 degrees, said angle need not necessarily be 90 degrees to accomplish substantially the object which I have demonstrated.

Figure 7:
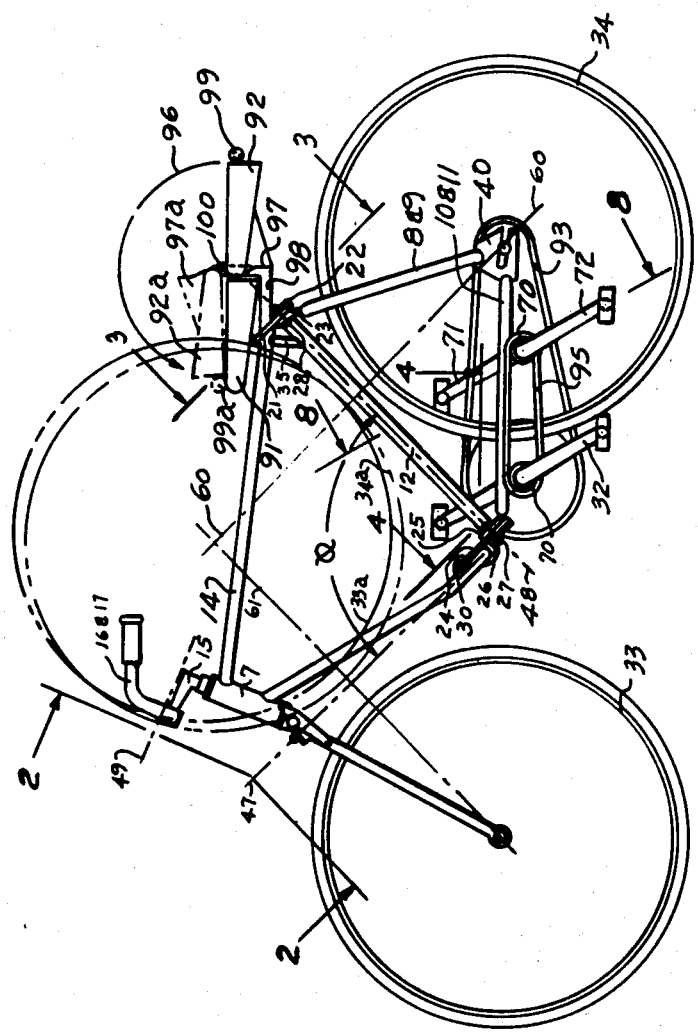
FIG. 7 is a view of a tandem bicycle configuration with two seats for the riders and two sets of pedals.
Figure 8:
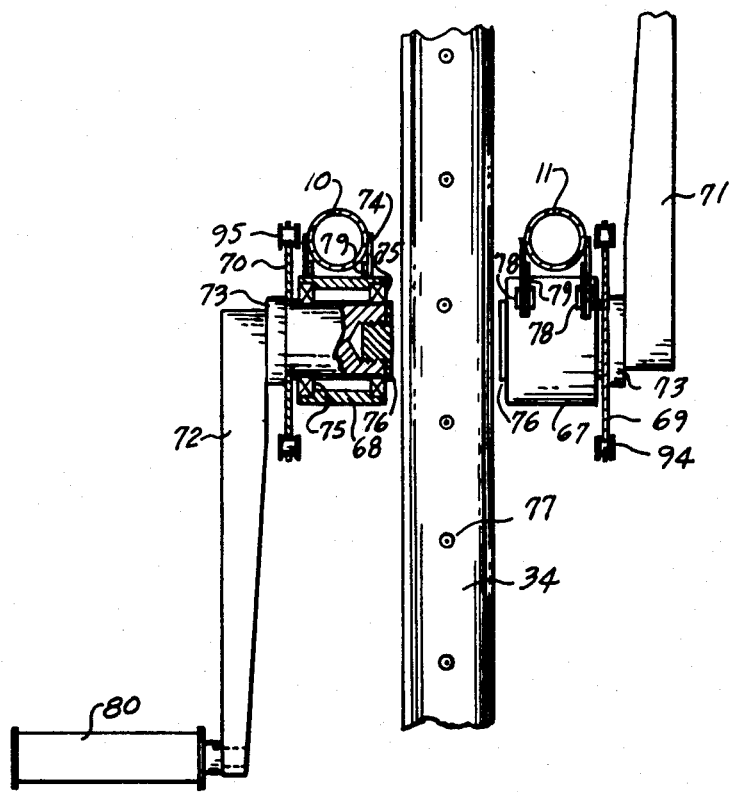
FIG. 8 is a sectional view taken on line 8—8 in FIG. 7 showing the pedal assembly for the aft rider.

As shown in FIG. 7 the dual tandem bicycle is comprised substantially of a main frame body assembly illustrated in a men's configuration, a front wheel fork assembly, although a ladies model configuration may also be configured, a handle bar assembly, and a rear wheel fork assembly. The rear wheel fork assembly has a dual set of pedal assemblies, the aft set of which is shown in FIG. 8. A dual seat configuration in FIG. 7 is also shown which may be folded forward to the 92a folded position about pintle 100. Aside from the dual pedal assembly and the dual seats, the dual tandem bicycle, except for the tubular bar 14 in FIG. 1, has all parts in common or they are similar to the parts shown in the girl's bicycle in FIG. 1. Tubular bar 14 in FIG. 1 is not similar to tubular bar 14 in FIG. 7 but performs a similar structural function to support the rear folding hinge axis and latching or locking means.

Since there is the similarity of parts in FIGS. 1 and 7 as noted in the above paragraph, the description of the dual tandem bicycle in FIG. 7 is identical to the description of the girl's model bicycle in FIG. 1, as described above except as noted as follows: In FIG. 7, tubular bar 14 is horizontal and interconnects fork journal 7 and seat post 35 and fitting 21. Extending aft from tubular bar 14 and fitting 21 is a tandem seat support fitting 98 which includes a horizontal pintle 100 to which tandem seat 92 is hinged. The horizontal pintle 100 must be on a level with or above the forward seat 91 and tandem seat 92 to allow the tandem seat 92 to fold on top of the forward seat 91 when the bicycle is folded. Seat 92 has a downward extending stop 97 which prevents the seat 92 from rotating downward when it is carrying a tandem rider.

The tandem seat 92 is folded in the direction of arrow 96 and takes the position indicated at 92a, 99a, and 97a in FIG. 7. The tandem seat 92 rotates about the pintle 100 when it is folded as shown by the arrow 96. It takes a position between the two wheels 33a and 34a when the bicycle is folded.

In FIG. 7 tubes 10 and 11 are attached to pedal housing 67 and 68 shown in FIG. 8 by means of fittings 74 and 79. These housings support the aft pedal cranks 71 and 72 in FIG. 7 provided for the tandem rider. The aft pedals 80 are attached to the pedal cranks 71 and 72. Each pedal assembly 71 and 72 is separately interconnected to the front pedal crank 32 by separate chains 94 and 95 by means of chain sprockets 69 and 70 in FIG. 8. In FIG. 7 there are similar chain sprockets 69 and 70 interconnected to the forward pedal crank 32 which the pedal torque produced by the tandem rider from the aft pedal housings 67 and 68 is delivered. It is anticipated that a tandem bicycle with structural tubular bar 14 in FIG. 7, in the tandem bike can be located as tube 14 is in the girl's configuration in FIG. 1, or 14 may be eliminated relying on the single tube 13 in FIGS. 1 and 7 with 13 being an enlarged structural member for the increased load as a single load bearing member.

The aft pedal housing 67 and 68 and tension of chains 94 and 95 are adjustable fore and aft through the adjustment screws 78 and slots in mating fittings 74 and 79 shown in FIG. 8. The pedal crank 72 is secured to the chain sprocket 70 journal 73 which protrudes through housing 68 and is supported in the housing 68 by the bearings 75. A thrust nut 76 retains the journal 73 in the housing by thrusting against the inboard bearing 75 as shown in FIG. 8.

In FIG. 9 adjustment means is provided for latch 24 through the eccentric shoulders 64 and 83. The eccentric 64 and 83 has a shoulder center line 84 which rotates about the bolt center 85, which will cause adjustment in the latch 24 according to arrow 101 dependent upon the selection of direction of rotation in the eccentric 64. The tube 13 has supporting shoulders and a hole to receive the bolt 30 which is retained by the nut 82 which clamps the eccentric 64, spring detent 80, detent 81, and latch 24 which contains the hook slot 59. The eccentric comprising 64 and 83 in FIG. 9 provides linear adjustment which removes the looseness in the folding joints when properly adjusted when the bicycle is unfolded and ridden. The eccentric is preset and preadjusted prior to locking and unlocking the latches.

As shown in FIGS. 3, 3a, 4, and 4a the girl's folding bicycle is made possible by the unique design configuration and assembly of the fittings 21 and 23 in FIGS. 3 and 3a and fittings 26 and 25 in FIGS. 4 and 4a which are configured to clear tube 12 which is a part of the frame assembly, tubes 13, 14, 7, and 12. This disclosure anticipates that the center frame configuration may use only one lower member remaining to provide adequate structural strength and torsional rigidity when the other member is omitted.

Additionally in these FIGS. 3a, and 4a are shown the detents 81 which safely secure the latches 22 and 34 from inadvertently releasing which can be responsible for very serious accidents if released accidently. The leaf spring 80 provides the spring force to retain the detent 81 in the hole in latch 24 in FIG. 9. The detents 81 by means of spring 80 engage the cavities 88 as shown in FIGS. 3a, and 4a and retain the latches 22 and 24 securely in the locked position when the forks are unfolded. A similar detent retains the latch 18 in FIG. 2 on the front fork. The leaf spring 80 supporting the detent 81 in FIG. 9 is clamped to the latch 24 by means of the shoulder of the eccentric 64. The spring force exerted by said leaf spring 80 causes detent 81 to protrude through latches 22 and 24 and to engage the receptacle cavities 88 shown in FIGS. 3a and 4a and a similar receptacle cavity in FIG. 2 which is shown but not numerically identified.

Figure 10:
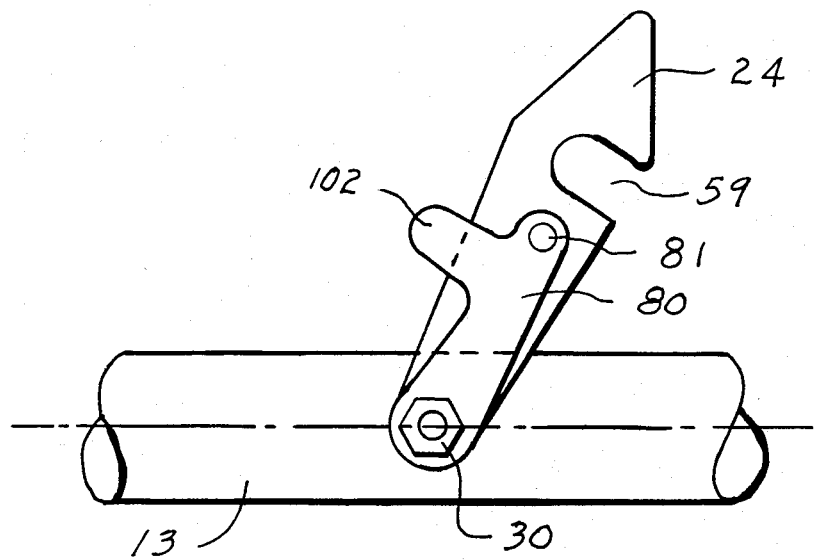
FIG. 10 is a view of an alternate lock similar to 24 & 80 at line 9—9 in FIG. 4A taken on line 10—10 in FIG. 9 showing means to manually release the detent means to actuate detents.

In FIG. 10 is shown the manually releasable detents 81 modified with an extended tab 102 which is added to the cantilever type leaf spring 80, thereby, presenting a means to manually grasp spring 80 and to manually lift 81 out of the detent receptacle thus providing manually releasible means to hook 24. As an alternate locking means FIG. 10 is applicable to all hooks 81, 22, and 24 shown in FIGS. 1, 2, 3, 3a, 4, 4a, 5, 7, and 9.

Without further description it is believed that the advantages of the present invention over the prior art are apparent, and while only two embodiments of the same are illustrated, it is to be expressly understood that the same is not limited thereby as various changes may be made in combination and arrangement of parts illustrated, as will likely appear to others and those skilled in the art. It is to be understood that these together with other variations in details are anticipated by the appended claims.

What I claim is:

1. A folding bicycle comprising means to fold on two axes with the front and rear wheels substantially coaxial side by side comprising three hingedly interconnected frame structural unit assembly means, side by side when folded; with a center frame structure unit assembly means hingedly connected with hinge means to a rear wheel fork unit assembly means and in the front with a steering journal housing means connected to a front wheel fork unit assembly means with hingeable means in the fork above the wheel and below said steering journal housing means to fold the front wheel aft beside the rear wheel when the bicycle is folded, said center frame structure unit assembly comprising a fixedly integral substantially triangular truss structure means with a rear spreader bar structure means, a lower structural member means, an upper structural member means connected to the said forward steering fork journal housing means with said journal housing means connecting the lower structural member means, a seat post means fixedly secured to said rear spreader bar means and to said upper structural member to support a rider's seat, said rear fork assembly means comprising interconnected upper and lower fork means with a pedal housing means fixedly attached to the lower fork means for mechanically driving the rear wheel of the bicycle operable lock means at said front and rear folding axes to alternately fold the bicycle and to lock the center frame means and the front and rear fork means in the unfolded configuration when the bicycle is ridden, said lock means having preset and preadjustment means adjustable prior to locking the lock means to remove the looseness in the lock means when the bicycle is locked in the unfolded configuration for riding.

2. A folding bicycle comprising means to fold on two axes with the front and rear wheels substantially coaxial side by side, comprising three hingedly interconnected frame structrual unit assembly means side by side when folded; with a center frame structure unit assembly means hingedly connected with hinge means to a rear wheel fork unit assembly means and in the front with a steering journal housing means connected to a front wheel fork unit assembly means with hingeable means in the fork above the wheel and below said steering journal housing means to fold the front wheel aft beside the rear wheel when the bicycle is folded, said center frame structure unit assembly comprising a fixedly integral substantially triangular truss structure means with a rear spreader bar structure means, a lower structural member means, an upper structural member means connected to said forward steering fork journal housing means with said journal housing means connecting the lower structural member means, seat post means fixedly secured to said rear spreader bar means and to said upper structural member to support a rider's seat, said rear fork assembly means comprising interconnected upper and lower fork means with a pedal housing means fixedly attached to the lower fork means for mechanically driving the rear wheel of the bicycle, releasable lock means at said hinge means and hingedable means to alternately permit folding the bicycle forks and frame and to lock said forks and frame in the unfolded configuration for riding the bicycle, the releasable lock means comprising articulate hook means secured in the locked position with releasable detent means in the lock means which can be released when the bicycle is secured in the unfolded configuration for riding, wherein said articulated hook means comprises preset and preadjustment means adjustable prior to engaging the hook means, to remove the looseness in the said hook means when said bicycle is locked in the unfolded configuration for riding.

3. A bicycle with a top horizontal bar in the bicycle frame configured for men's model or a bicycle without a top horizontal bar configured for a lady's model comprising means to fold said bicycle frame on two axes with the front and rear wheels substantially coaxial side by side, and comprising three hingedly interconnected frame structural unit assemblies side by side when folded with the center frame structure assembly hingedly connected with hinge means to a rear wheel fork assembly, and in the front joined to a steering journal housing means joining a fork steering means connected to a front wheel fork assembly with hingeable means in said fork assembly above the wheel and below said steering journal housing to fold the front wheel aft beside the rear wheel when folded, said center frame assembly comprising a fixedly integral structure means with a substantially vertical spreader bar means in the rear also integrally associated with a rider's substantially vertical seat post means, one or more lower structural member means connecting said vertical spreader bar means in the rear and in the front joining said steering journal housing at said front fork, said rear fork assembly comprising an interconnected upper and lower fork at the rear wheel supporting a pedal housing means; pedal crank means forward of the said rear wheel for mechanically driving the rear wheel by means of a drive chain lock means at said hinge means and said hingeable means operable to lock the center frame means with the front and rear fork means in the unfolded configuration when the bicycle is ridden, said lock means comprising preset and preadjustment means to preadjust the lock means to remove the looseness.

4. A bicycle with a top horizontal bar in the bicycle frame configured for men's model or a bicycle without a top horizontal bar configured for lady's model comprising means to fold said bicycle frame on two axes with the front and rear wheels substantially coaxial side by side, and comprising three hingedly interconnected frame structural unit assemblies side by side with the center frame structure assembly hingedly connected with hinge means to a rear wheel fork assembly, and in the front joined to a steering journal housing means joining a fork steering means connected to a front wheel fork assembly with hingeable means in the said fork assembly above the wheel and below the said steering journal housing to fold the front wheel aft beside the rear wheel when folded, said center frame assembly comprising a fixedly integral structure means with a substantially vertical spreader bar means in the rear also integrally associated with a rider's substantially vertical seat post means, one or more lower structural member means connecting said vertical spreader bar means in the rear and in the front joining the said steering journal housing at the said front fork, said rear fork assembly comprising an interconnected upper and lower fork at the rear wheel supporting a pedal housing means and pedal crank means forward of the said rear wheel for mechanically driving the rear wheel of the bicycle by means of a drive chain, releasable lock means at said hinge means and hingeable means to lock said forks and frame in the unfolded configuration for riding the bicycle, the releasable lock means comprising articulated hook means secured in the locked position with releasable detent means which can be released to unlock the lock means and having preset and preadjustment means to remove the looseness in the hook means prior to engaging the said hook means when the bicycle is locked in the unfolded configuration for riding.

5. A bicycle for tandem riding comprising means to fold on two axes with the front wheel substantially coaxial with the rear wheel side by side, comprising three hingedly interconnected frame assemblies with a center frame assembly hingedly connected with hinge means to a rear wheel fork assembly and in the front to a steering journal housing means joining a fork means connected to a front wheel fork with hingeable means in the said fork above the wheel and below said steering journal housing means, said hinge means permitting the folding of the front wheel aft beside the rear wheel when folded, said center frame assembly comprising a fixedly integral substantially triangular frame structure with a rear substantially vertical spreader bar, a lower structural member attached forward to said steering journal housing means and also connected to said spreader bar, a top structural member connecting said spreader bar and said forward steering journal housing means, a seat post means fixed to said spreader bar to support a rider's seat, said rear fork assembly comprising a forward pedal crank and housing means attached to the lower fork forward of the rear wheel for mechanically driving the rear wheel tandem riding seat means comprising a second seat means aft of said forward rider'seat, and second set of pedal crank means aft of said forward pedals and forward of the rear wheel center; said second set of pedal crank means, one on each side of the said rear wheel, comprising separate driving means connected forward to said forward pedal crank and housing means, said forward pedal crank and housing means comprising additional mechanical means to receive the driving torque from said second set of pedal crank means, thereby providing a folding bicycle with means to be ridden by two riders in tandem with both riders propelling the bicycle, lock means at the said front and rear folding axes to fold the bicycle and to lock the center frame and the front and rear fork in the unfolded configuration when the bicycle is ridden, the said lock means comprising preset and preadjustment means to remove the looseness in the lock means.

6. A folding bicycle for tandem riding with two riders configured with a top horizontal bar for men's model configuration or with the top horizontal bar omitted for lady's model configuration with the front wheel substantially coaxial with the rear wheel side by side when folded, comprising three hingedly interconnected separate frame structural assemblies with the center frame structure hingedly connected with hinge means to a rear wheel fork, and in the front of the said center frame to a steering journal joining a front fork means connected to a front wheel fork assembly having hingeable means in said fork above the wheel and below said steering journal housing to fold the front wheel aft beside the rear wheel, said center frame structure comprising a structure with a substantially vertical spreader bar in the rear associated with a rider's substantially vertical seat post means and forward seat means, said rear fork comprising an interconnected upper and lowr fork having forward pedal crank housing means forward of the rear wheel fixedly attached to the lower fork aft of said hinge means to the center frame for mechanically driving the rear wheel of said bicycle, tandem riding means comprising a second seat means aft of said forward seat associated with said forward seat secured to said center frame to fold the aft seat over the said forward seat, on said rear wheel lower fork located forward of the wheel center and aft of said forward pedal crank housing means, a separately supported individual rear pedal crank and housing means on each side of said rear wheel comprising separate chain sprockets with associated chains going forward to said forward pedal crank and housing means, said forward pedal crank and housing means comprising additional crank sprockets on each side of said forward pedal crank and housing means to receive said driving chains from said rear separate pedal crank and housing means for transfering the driving torque from the rear pedal cranks to the forward pedals, thereby providing a bicyclc with tandem means to be ridden by two riders with each rider propelling the bicycle lock means at said hinge means and hingeable means to fold the bicycle and to lock the center frame and the front and rear forks in the unfolded configuration when the bicycle is ridden, said lock means comprising preset and preadjustment means to remove the looseness in the lock means when the bicycle is locked in the unfolded configuration for riding.

* * * * *